(12) United States Patent
Kuznetsov et al.

(10) Patent No.: US 8,706,716 B2
(45) Date of Patent: Apr. 22, 2014

(54) ITERATIVE AND DYNAMIC SEARCH OF PUBLICLY AVAILABLE DATA BASED ON AUGMENTATION OF SEARCH TERMS AND VALIDATION OF DATA RELEVANCE

(75) Inventors: Vsevolod Kuznetsov, Sankt-Petersburg (RU); Andrey N. Nikankin, Sankt-Petersburg (RU)

(73) Assignee: Rawllin International Inc., Tortola (VG)

( * ) Notice: Subject to any disclaimer, the term of this patent is extended or adjusted under 35 U.S.C. 154(b) by 109 days.

(21) Appl. No.: 13/303,923

(22) Filed: Nov. 23, 2011

(65) Prior Publication Data

US 2013/0132360 A1   May 23, 2013

(51) Int. Cl.
*G06F 17/30* (2006.01)
(52) U.S. Cl.
USPC ............................ 707/722; 707/748; 707/758
(58) Field of Classification Search
None
See application file for complete search history.

(56) References Cited

U.S. PATENT DOCUMENTS

| | | | |
|---|---|---|---|
| 6,411,950 B1 | 6/2002 | Moricz et al. | |
| 6,611,825 B1 | 8/2003 | Billheimer et al. | |
| 7,451,152 B2 | 11/2008 | Kraft et al. | |
| 7,818,394 B1 | 10/2010 | Lawler et al. | |
| 2004/0230598 A1* | 11/2004 | Robertson et al. | 707/102 |
| 2010/0017300 A1* | 1/2010 | Bramlage et al. | 705/26 |
| 2010/0145976 A1 | 6/2010 | Higgins et al. | |
| 2010/0250578 A1* | 9/2010 | Athsani et al. | 707/765 |
| 2010/0306215 A1* | 12/2010 | Azar et al. | 707/759 |

OTHER PUBLICATIONS

Anonymous, 'System, Method, and Computer Program for Augmenting User Profiles', IPCOM000198121D, Jul. 26, 2010, http://ip.com/IPCOM/000198121, 22 pages.

* cited by examiner

*Primary Examiner* — Son T Hoang
(74) *Attorney, Agent, or Firm* — Amin, Turocy & Watson, LLP

(57) ABSTRACT

Validation measures related to information obtained from publicly available data sources are generated for providing recommendations about a potential client. Trusted search criteria are used to obtain a set of query results. These results are used to gather metadata associated with a potential client for loan offers. The validation measures are initiated from the associations and used to modify the search criteria or identifying data for searching further. A credit worthiness score related to the potential client is configured based on the validation scores and relevancy of the data. The client information is updated dynamically with continued modification of the initial search criteria in order to alter a scope and improve an accuracy of information.

22 Claims, 10 Drawing Sheets

ITERATIVE AND DYNAMIC SEARCH OF PUBLICLY AVAILABLE DATA BASED ON AUGMENTATION OF SEARCH TERMS AND VALIDATION OF DATA RELEVANCE

TECHNICAL FIELD

The subject application relates to iterative and dynamic searching of publicly available data based on augmentation of search terms and validation of data relevance.

BACKGROUND

A number of consumers have experience with short term loans, payday advances, cash advances, and so forth. These types of financial instruments often require proof of employment and financial viability, such as a checking account and evidence of employment. Typically, the interest rate for such instruments can be high, due to the level of risk experienced by the lender. However, when a consumer needs to obtain a quick credit decision, there may be few alternatives except borrowing from pawn shops, friends, or family.

Additionally, consumers are frequently presented with opportunities to apply for instant approval of credit during internet shopping, or at the point of sale during traditional in-store shopping. Often the consumer can charge a current purchase to the new account if they are approved, and may be able to take advantage of one or more promotions for applying. However, consumers having little, or no, credit history are unlikely to be approved for these credit cards, such as with college students trying to start careers for the first time or groups of elderly always wary of credit. In addition, some consumers choose not to use credit cards, or elect not to go through the application process at the time that the offer is presented.

Moreover, retailers often attempt to persuade consumers to purchase additional items, or items related to items that the consumer is purchasing. In order to tailor the suggestions to the desires of the consumer, some retailers employ loyalty cards that enable the retailer to monitor the buying patterns of the consumer. Similarly, online retailers often encourage consumers to maintain a user account with the retailer, and data tracked via the user account can be used to suggest purchase options, or tailor promotions based on the consumer's buying patterns. However, similar to instant credit card applications, some consumers choose not to go through the loyalty card application or online account setup process.

The above-described deficiencies of today's credit application and promotional tools lend for the need to better serve and target potential clients. The above deficiencies are merely intended to provide an overview of some of the problems of conventional systems, and are not intended to be exhaustive. Other problems with conventional systems and corresponding benefits of the various non-limiting embodiments described herein may become further apparent upon review of the following description

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Various embodiments for iterative and dynamic searching of publicly available data based on automatic augmentation of search term and validation data are contained herein. An exemplary system comprises a search engine configured to receive identifying data that is related to a client and to generate a first set of search results related to the client from a set of data sources based on the identifying data. A profile analyzer of the system is configured to retrieve the first set of search results, to generate a client profile with metadata associated with the client and to rank the metadata according to a validation measure. An augmentation module is coupled to the search engine that is configured to select at least a portion of the metadata as a set of search data from the client profile. The augmentation module is configured to modify the identifying data with the set of search data as modified identifying data and to initiate a search for a second set of search results related to the client from the set of data sources based on the modified identifying data. The profile analyzer is further configured to update the metadata of the client profile for an updated client profile by a dynamic re-rank of the metadata associated with the client and the validation measure based on the second set of search results.

In another non-limiting embodiment, a method comprises receiving a set of first identifying data that is related to a client at an input component of a search engine. A first search of a set of data sources is received with the set of first identifying data by the search engine resulting in a set of search results. Metadata related to the client is selected from the set of search results to include in a client profile. The client profile is generated with a profile analyzer coupled to the search engine and a validation measure is associated with the metadata. The method includes modifying the set of first identifying data with a set of search data selected from the metadata in the client profile to form a set of second identifying data, executing a second search of the set of data sources using the set of second identifying data to obtain additional search results, and updating at least a part of the metadata of the client profile and the validation measure associated with the metadata based on the additional search results.

In still another non-limiting embodiment, an exemplary computer readable storage medium having computer executable instructions that, in response to execution by a computing system, cause the computing system to perform operations that comprise receiving at a search engine a set of first identifying data related to a client from an input component, executing with the search engine a first search of a set of data sources using the set of first identifying data resulting in a set of search results, selecting metadata included in the set of search results to include in a client profile, generating the client profile having the search results with a profile analyzer and associating a validation measure with the metadata related to the client, augmenting the set of first identifying data with a set of search data from the metadata in the client profile to form a set of second identifying data, executing a second search of data sources using the set of second identifying data to generate additional search results, and updating at least a part of the metadata of the client profile by dynamically re-ranking the metadata with the additional search results and the validation measure that is associated with the metadata.

In yet another non-limiting embodiment, an exemplary system is provided that includes means for searching with a set of identifying data associated with a client and to generate a first set of search results from a set of data sources, means for profiling a client with associated metadata retrieved from the first set of search results and with a rank associated to each metadata according to a validation measure, means for modifying the set of identifying data with the metadata to form a modified set of identifying data to initiate further searching of the modified set of identifying data for a second set of search results, and means for updating the metadata of the client profile by a dynamic re-rank of the metadata associated with the client and the validation measure based on a second set of search results.

DETAILED DESCRIPTION

Figure 1:
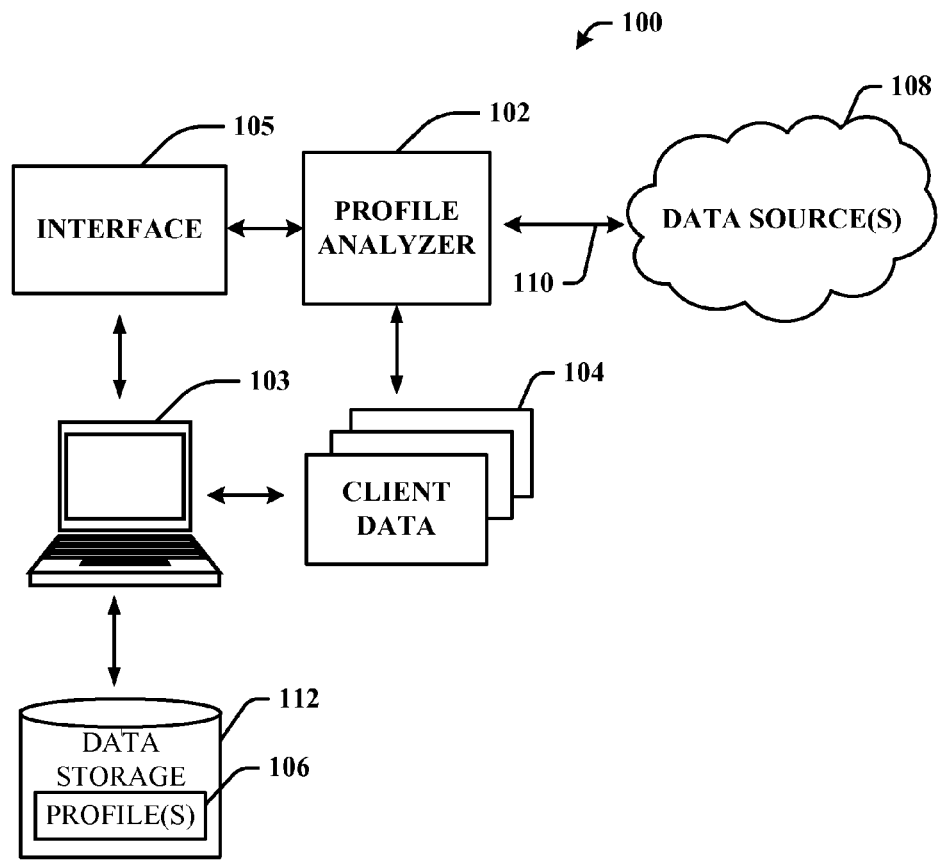
FIG. 1 illustrates an example recommendation system in accordance with various aspects described herein.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In consideration of the above-described deficiencies among other things, various embodiments are provided that dynamically mine data related to clients, and, more generally, is related to retrieving publicly available information, search engines, and information collected to generate a client profile.

To determine the credit worthiness of a client for a small loan, a large loan or some other financial instrument, information pertaining to the client's credit score is compiled into a client profile as metadata. Data sources are searched with trusted information to obtain search results, in which the client profile is dynamically updated with. Searching is preformed in a recommendation system that builds the client profile and provides advice or recommendation to a user/vendor based upon the client profile. For example, search iterations are performed by a search engine with terms that are modified or augmented by information in the client profile. Searching at each cycle therefore becomes more focused and reliable with each dynamic modification of the terms and updating of the profile.

Validity measures are assigned to metadata compiled in the client profile. These measures include scores that rank/rate validity and relevancy of the various metadata. The scores, for example, are determined based on frequency of occurrence within each search, the relationships or associations that the data has with data already compiled and data in each search result, a classification of the data, the data source in which the data originates, the number of relationships, and other weight factors for assessing validity and relevancy of data at each iteration of searching data sources. In return, an advisor component determines an offer to a client based at least in part on the validity scores and relevancy scores of metadata compiled in the client profile.

Referring initially to FIG. 1, illustrated is an example recommendation system 100 to output one or more recommendations pertaining to potential clients in accordance with various aspects described herein. The system 100 is operable as a recommendation system, such as to recommend credit to potential clients or to output other recommendations based on analysis of a dynamically and iteratively generated client profile and validation of the data related to the client profile.

For example, the system 100 includes a profile analyzer 102 that is operable to output a profile related to a search subject with certain client or identifying data 104 (e.g., a potential client). For example, a loan can be offered to a potential client based upon dynamically updated and validated data retrieved at a communication link 110 from data sources(s) 108. The profile analyzer 102 is configured to retrieve a first set of search results from data sources 108, to generate a client profile 106 with metadata associated with the client and to rank the metadata according to a validation measure. For example, the profile analyzer 102 obtains data relating to one or more clients 104, and dynamically generates a profile of candidate characteristics 106 (profile 106) based at least in part on the data obtained. The characteristics are assimilated as metadata associated with the client profile 106 in storage 112. In addition, the analyzer 102 can classify, decide, or otherwise determine an eligibility of the user 104 for one or more offers based at least in part on the profile 106.

In one embodiment, the analyzer 102 receives one or more identification data associated with a client 104, which is used as search data or key search terms. For example, the identification data can include a client's name, a date of birth, an email address, a geographical region, a home address, a phone number, a gender, a symbol and the like. Other identifying data may also be included, such as a history of transactions with a vendor or user of the recommendation system. For example, where a loan processing recommendation is the desired output from the recommendation system, the identifying data searched may be the history of usage with the financial services of the financial institution or lender.

The analyzer 102 acquires data, for example, relating to a person that is the potential client 104 by searching a set of data sources 108 using the known identifying data about a client 104, and collecting a set of search results, which are then used to generate and update the client's profile. A processing unit 103 has an interface communicatively coupled thereto, such as a user interface, GUI or the like and further provides interaction with the profiles 106. The initial identifying data 104 may be any data known about the client, such as a name or symbol to such as data retrieved from official data sources 108 that are private and/or public sources. For example, identifying data from various credit agencies (e.g., TranUnion, Experion, Equifax), vendor stored databases, or any other official/private data source that is trusted for reliability is used as the initial identifying data for searching the potential client among public data sources or data sources that are always publically available. Additionally, data that may be initially searched with high reliability may be a client's name, email address, geographical address, transaction history and the like.

The analyzer 102 is operable therefore as a person analyzer component to start analysis of a person as a potential client for a business loan, for example. The analyzer 102 connects to the data sources 108 via a communication link 110 (e.g., comm link, network connection, etc). For example, the aggregator component 102 can obtain a set of data relating to the user 104 by querying one or more internet search engines based on the identifiers provided regarding the client.

The analyzer 102 inspects information included in the set of search results, and generates the profile 106 for the user 104 based at least in part on the information therein. The analyzer 102 is configured to determine that a set of information in the search results is relevant to the potential client, and includes the set of information in the profile 106 as metadata. The metadata stored in data storage 112 is further ranked according to a validation measure and is augmented to the first set of identifying data for further defining search terms in further searches for information pertaining to the client. For example, a name may be used to generate a first set of search results for the set of information stored as metadata. The metadata is weighted or associated with the name to varying degrees so that the weight of each association, for example, may vary depending upon the manner in which the metadata relates to the name. For example, a frequency or a number of times the name is associated with each search result may be ranked together and in addition based upon metadata accumulated in an aggregate data store of the client profile. For example, an alias or nickname for the name being searched may appear a number of times over multiple searches over time, and/or be a search result that is generated in conjunction with other metadata, and thus, indicate a higher likelihood that the data is correct or valid.

The validation measure includes a validation score that could be in different forms and is not limited to any one weight mechanism. For example, a weighted mechanism can include a binary digit, decimal digit, any other numbering system of a different base, a scale (e.g., from one to ten), graphical weight, and the like. Each weighted association thus provides an indication of a strength of a relationship between data retrieved and data stored and each subsequent search further refines the validation strength of identifying data stored in the client's profile 106. For example, the profile analyzer 102 is configured to update the metadata of the client profile by a dynamic re-rank of the metadata and the validation measure based on a second set of search results. The data retrieved, for example, comprises the search results for each search that is dynamically and iteratively generated with modified or augmented identifying data from the profile 106 compiled from previous searches of data sources. While the validation measure or weight mechanism, for example, varies according to fuzzy logic variables, analog logic, digital logic inputs, rule based values, neural network controls and the like, the resulting weight factor or validity factor is updated and changed with each set of search results for further refining the accuracy of validity and relevancy of the data found as it relates to the client.

In one embodiment, the analyzer 102 can determine the client's 104 offer eligibility based on the profile 106 satisfying a set of predetermined criteria. The predetermined criteria include validity and relevance of the data that has been updated by modified searching or augmented search data. For instance, if the profile 106 satisfies a predetermined set of loan criteria, then the analyzer 102 can determine that the user 104 is eligible for one or more loans. It is to be appreciated that although the profile 106 is illustrated as being stored in a data store 112, such implementation is not so limited. For instance, the profile 106 can be associated with an online shopping portal, stored in a cloud based storage system, or the data storage 112 can be included in the analyzer 102 or a data source 108. In addition, it is to be appreciated that although the analyzer 102 is illustrated as a stand-alone component, such implementation is not so limited. For instance, the analyzer 102 can be associated with or included in a software application, an online shopping portal, and so forth.

The data sources 108 can include virtually any open source or publicly available sources of information, including but not limited to websites, search engine results, social networking websites, online resume databases, job boards, government records, online groups, payment processing services, online subscriptions, and so forth. In addition, the data sources 108 can include private databases, such as credit reports, loan applications, and so forth.

Figure 2:
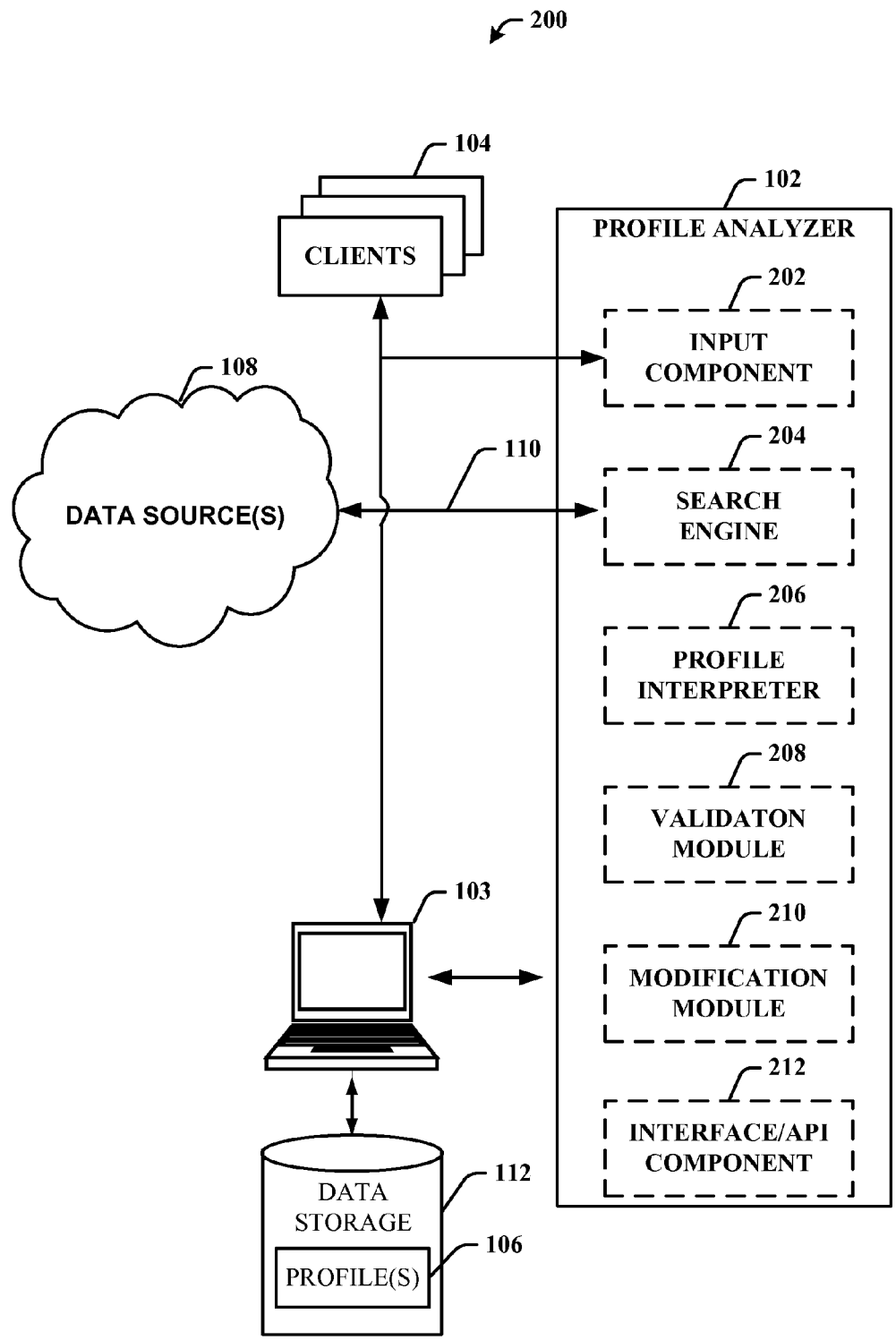
FIG. 2 illustrates another example recommendation system in accordance with various aspects described herein.

Referring now to FIG. 2, illustrates an example consumer recommendation system 200 for providing a recommended loan offer to a potential client in accordance with various aspects described herein. As discussed previously, the analyzer 102 can acquire data relating to a user 104, generate a profile 106 with a computer unit 103 based at least in part on the data, and further determine an eligibility of the user 104 for one or more offers based at least in part on the validity and relevance of the data in the profile 106. The aggregator component 102 includes an input component 202, a search component 204, a profile interpreter 206, a validation engine module 208, a modification/augmentation module 210 and an interface/API component, for example. The input component 202 can obtain, acquire, or otherwise receive one or more identifiers associated with the client as identification data, which is to be searched. For example, the profile analyzer 102 can execute via a software application wherein the input component 202 can generate one or more user interfaces enabling a user to input initial identifying data. Additionally or alternatively, the identifiers can be input by a disparate user, such as a customer service representative, an agent, etc., or the identifiers can be dynamically obtained from a source, such as the data storage 112 or the data sources 108.

The search engine 204 retrieves identifying data pertaining to a potential client. The identifying data includes a set of search terms (e.g., keywords, query terms, etc.). In addition, the search component 204 can identify, ascertain, or otherwise determine a set of data sources 108 to search based on the search terms or identifiers. For example, the identifiers can include a set of demographic information (e.g., age, location, etc.) for the user 104, and the search component 204 can determine to search a set of websites frequented by users having similar demographic information, or a set of search engines having a high probability of locating information relating to users having similar demographic information. In addition, the search component 204 can perform, direct, or otherwise execute a search on the determined set of data sources 108, and obtain a set of search results for the client identifying data 106. Continuing with the previous example, if the search component 204 determines that information relating to users having similar demographic information can be found via a first and second search engine, then the search component 204 can query the first and second search engine using the search terms.

The profile interpreter 206 examines, inspects, or otherwise analyzes the set of search results returned by the search component 204, and determine a subset of search results that are appropriate for inclusion in the profile 106 associated with the user 104. The profile interpreter 206 can determine that one or more subsets of search results are relevant for inclusion in the profile 106 based on a correlation with a set of predetermined characteristics, or satisfaction of a set of predetermined criteria. For example, the set of predetermined criterion can include, but are not limited to, a relation of a search result to the user 104, a trustworthiness of the source from which the search result was obtained, or a classification of the result. For example, if the search engine 204 returns a social networking website profile for a user having the same name as the user 104, but the profile information (e.g., data birth, email address, etc.) is different from the identifiers known for the user 104, then the profile interpreter 206 can determine that the social networking website profile, or information included in the social networking website profile, should not be included in the profile 106.

The validation engine module 208 further examines the profile 106, and determines validity measure for the identifying data 104 and metadata stored in the client's profile 106. The measure can be associated with each metadata indicating a strength of relevance and/or reliability to the client identifying data 106. Additionally, the validation measure may correspond to relationships of data in the searched results with metadata in the client profile and/or with the identifying data. For example, if an email for a potential client is searched as the initial identifying data, the results may include different domain names in conjunction with dates of birth. A domain name associated with a data of birth for the user name of the email as stored in the client profile would have a higher score for reliance and/or validity than a domain name by itself.

Further, a validation measure can be provided by the validation module 208 based on a frequency of occurrences (e.g., hits) or search results for the given piece of data retrieved (e.g., first set of search results, second set of searches results, etc.). For example, where a client's email is searched, such as with a user name as the identifying data, a domain name occurrence within the results having a greater frequency than others would indicate strong association with the user name, and thus, be afforded a greater validation measure and ranked greater according to a given scale. The dynamic ranking or measure may be a binary, decimal, scaled on a range, or some weight provided to indicate a relationship or association strength. The validation engine 208 is further configured to change at least one validation score of the validation scores in response to a change of a strength of at least one association of the associations of the data in the client profile or a change of at least one of the metadata. The updating of scores, for example, is based on a change in a number of the associations among the identifying data, the first set of search results, the second set of search results, and/or the metadata.

The profile analyzer 102 also includes a modification/augmentation module 210 that provides an iterative and dynamic search process to the search engine 204. According to the rankings or validity measures provided to the data and various relationships of the metadata stored in the client's profile, the modification module 210 selects data to modify the identifying data searched as further search data and/or modifies the initial identifying data to increase accuracy and/or relevancy for further information and further validation of the metadata associated in the client's profile. The modification module 210 is configured to select a set of search data from among metadata stored that has one or more validation scores that meet a condition of a predetermined function, for example. Different search results are relevant for inclusion in the profile 106 based on a correlation with a set of predetermined characteristics, or satisfaction of a condition of a predetermined function. For example, a predetermined function can include, but is not limited to, a relation of a search result to the user 104, a trustworthiness of the source from which the search result was obtained, or a classification of the result. For example, if the search engine 204 returns a social networking website profile for a user having the same name as the user 104, but the profile information (e.g., data birth, email address, etc.) is different from the identifiers known for the user 104, then the modification engine 206 can determine that the social networking website profile, or information included in the social networking website profile, should not be included in a new set of search data for the client at a subsequent or second search.

Therefore, an iterative and dynamic search process is performed with each cycle increasing the accuracy, amount, and relevance of the client profile information. Some metadata could be discarded dynamically. For example, where an address has been discovered to have been changed according to a strong validation measure being associated with a new address. Likewise, additional data discovered with modified/augmented identifying data searched by the engine 204 may be added to the client's profile. The various rankings are further updated with each new augmented or modified search that indicates a change in relationship of the data and/or a frequency of occurrences in association with the identifying data of each iterative search.

The interface component 212 includes any suitable and/or necessary adapters, connectors, channels, communication paths, etc. to integrate the system 200 into virtually any operating and/or database system(s) or a particular set of rules (code) and specifications that software programs can follow to communicate with each other. It also serves as an interface between different software programs and facilitates their interaction, similar to the way the user interface facilitates interaction between humans and computers. Moreover, the interface component 212 can provide various adapters, connectors, channels, communication paths, etc., that provide for interaction with the system 200.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 3:
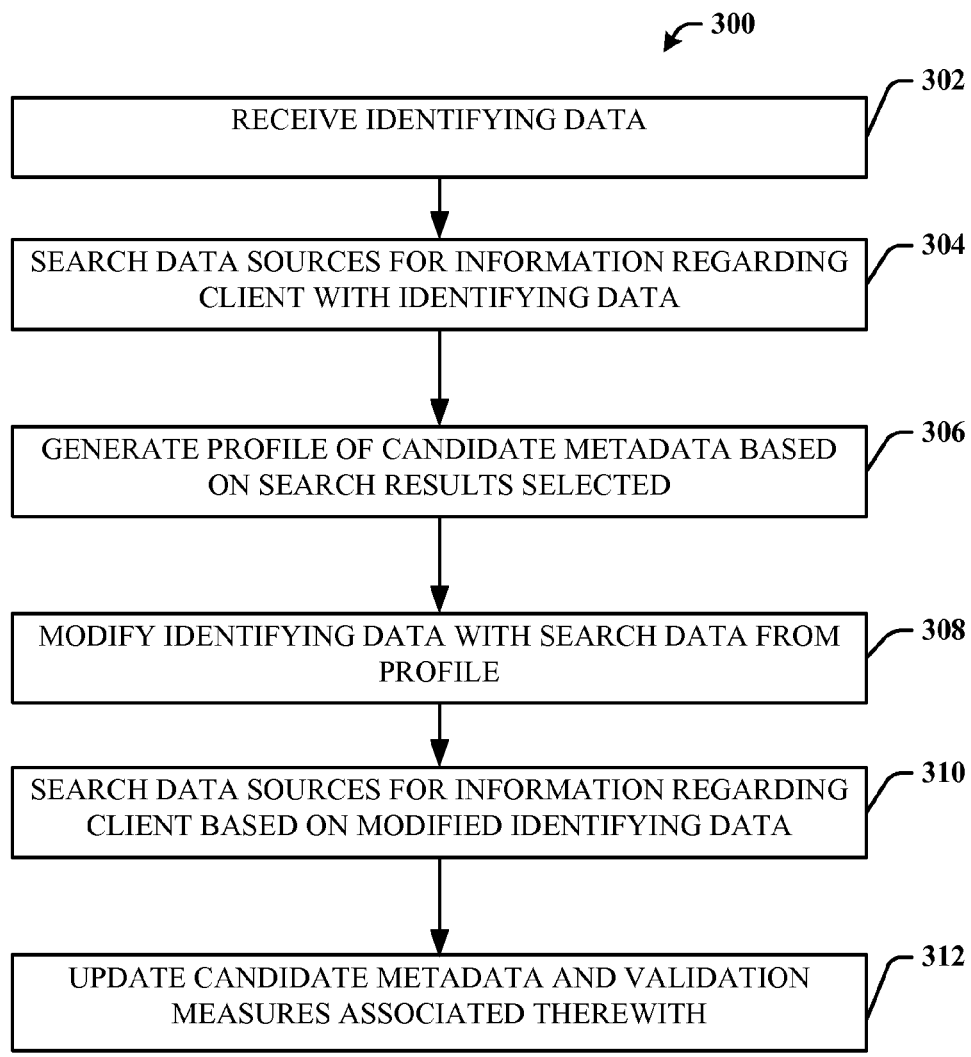
FIG. 3 is a flow diagram showing an exemplary non-limiting implementation for compiling information dynamically and a client profile.

An example methodology 300 for implementing a method for a recommendation system is illustrated in FIG. 3. Reference is made to the figures described above for ease of description. However, the method 300 is not limited to any particular embodiment or example provided within this disclosure.

FIG. 3 illustrates the exemplary method 300 for a recommendation system in accordance with aspects described herein. The method 300, for example, provides for a system to iteratively and dynamically search data regarding a potential client based on automatic augmentation or modification of the search terms (e.g., identifying data) related to the client while also dynamically and iteratively validating the data stored in a profile from each search. An output or recommendation, such as a recommendation for a loan is based on the validity of the data. Consequently, a more accurate and reliable profile of a potential client is obtained to serve a ready credit worthiness score on behalf of potential clients before even applying for a loan or other financial arrangement, for example.

At 302, a set of identifying data (e.g., identifiers, application fields, key words, etc.) can be received and utilized as search terms, user information, signature data, symbols and the like for executing a query for a subject matter or a potential client. For example, the set of identifying data can include a first name, a last name, a date of birth, age, an email address, user name, domain name, geographical residence, telephone number, history and the like. As discussed previously, the identifying data can be received from the user, extracted from a form extraction system, a disparate user (e.g., customer service representative, agent, etc.), obtained from a data store, or an associated profile and from any trusted source of data.

At 304, a set of data sources is searched for information regarding the user based on the identifying data received. The data sources can include virtually any open source or publicly available sources of information, including but not limited to websites, search engine results, social networking websites, online resume databases, job boards, government records, online groups, payment processing services, online subscriptions, and so forth. In addition, the data sources can include private databases, such as credit reports, loan applications, and so forth. At 306, a profile of candidate characteristics (profile) can be initially populated in a memory of the system based on the search results. The profile of candidate characteristics (metadata) can include data from the search results that corresponds, correlates, or otherwise matches a set of predetermined characteristics for determining offer eligibility.

At 308, the identifying data provided to obtain the search results is modified with search data from the profile. The modification can alter, augment, or otherwise reconfigured data stored in the profile. In other words, data stored (metadata) in the profile of the client is selected to augment/modify the original identifying data. The data can be used to further enhance the search for client data and further iteratively and dynamically update the client profile at each cycle of augmentation/modification of the identifying data initially searched. At 310, the search is continued with data sources as before for information pertaining to the client with the modified/augmented identifying data. Relationships among the metadata and frequency of occurrences are analyzed and used to provide a validity measure in which a creditworthiness score is determined. For example, where the information obtained about the client has a high validity and relevance to the client's credit score, a confidence or reliability score can be determined that results in a corresponding suitable loan offer to be recommended for the potential client.

At 312, the metadata or characteristics of the potential client stored in a client profile are updated according to the iterative searching of newly modified/augmented identification data. The validation measures associated with metadata of the profile are also updated according to metadata's strength of association with new search results from the modified/augmented identification data. Examples of metadata pertinent to client identifying data may be factors or attributed related to the person of the client, information from public sources, behavioral patterns, interests, etc., such as age, dependents (kids), spouse profession, area/region of employment, applicant income, spouse income, area/region of residence, homeownership/home value, phone number, years at current residence, years at current job, years client of financial institution issues a loan, credit/debit account availability, hobby, interests, preferences, internet activity statistics, payment delinquency, financial failures, and the like. The metadata may be information used as identifying data initially as well as searched results discovered and/or updated for each iterative search cycle.

The client profile is dynamically analyzed to determine the accuracy of the information included in the profile, and the relevancy of the information to determine eligibility for a client offer. The accuracy is determined by comparing the information to other known information, or additional search results, and generating a validation score indicating a confidence level of the information based at least in part on the comparison. If the validity score is within a predetermined confidence threshold or range, then the information is determined to have a high level of accuracy. Additionally or alternatively, the validation score can be generated based at least in part on whether the data satisfies a set of verification criterion. The relevancy of the information to the offer eligibility determination is determined based at least in part on a set of offer criterion. For example, the set of offer criterion for a loan can include a set of predetermined characteristics, such as age, gender, profession, income, residence, education, debt, and so forth, and if the data information included in the profile correlates to the criterion, then it is deemed relevant to a degree. Consequently, a loan offer or other financial product can be presented to a client based on the validity of information publicly available and relevancy of the data compiled.

Figure 4:
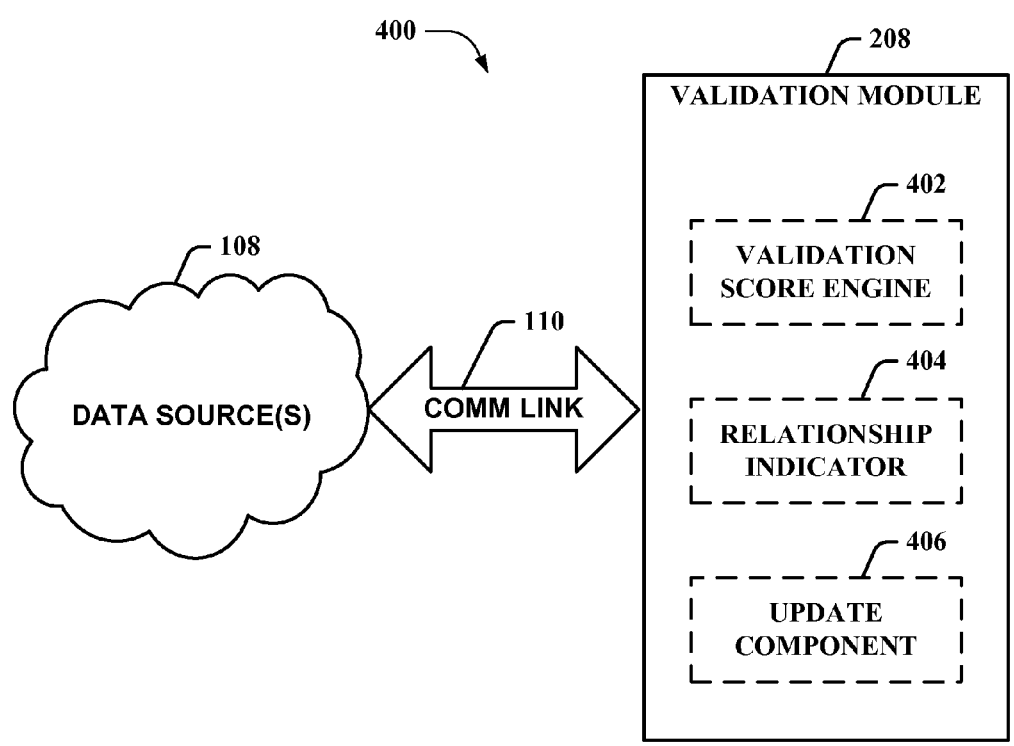
FIG. 4 illustrates an example validation module in accordance with various aspects described herein.

FIG. 4 illustrates an exemplary validation module 208 in further detail that includes a validation engine 402, a relationship indicator 404, and an update component 406. The validation engine 208 examines a client profile 106 having metadata, as shown supra, and determines validity scores with a validation score engine 402 for the different metadata. When terms are searched relationships among the searched identifying data (e.g., key search terms) are established and calculated in a relationship indicator 404. For example, a frequency of relation is also stored by the relationship indicator to keep track of the number of relationships or associations discovered between varying searched terms and metadata in a client's profile with each iterative search. The metadata includes the identifying data (e.g., key search terms) and also other metadata associated with the client to varying degrees. Scores assigned to the metadata are configured based on a strength of association among any given piece of data. For example, a greater number of associative relationships between different data indicates a stronger association with the client and is therefore more confidence is given to this data's validity. The scores comprise weights indicating a validity level or confidence factor indicating the association strength with each metadata to the identifying data used for the client. Scores may be decimal, binary (0 or 1), hex or some other numeric or alpha numeric system indicating a range or scale of terms and are not limited herein to any particular system.

Figure 5:
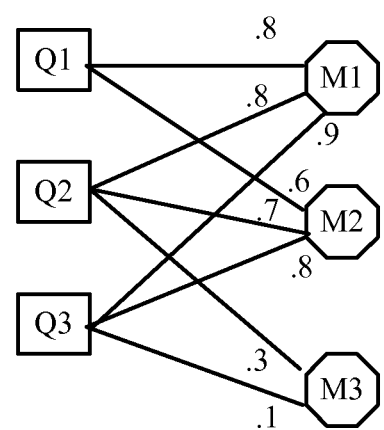
FIG. 5 illustrates an example graphical relationship for determining validity information dynamically in accordance with various aspects described herein.

For example, FIG. 5 illustrates a graph 500 that provides for different search queries (e.g., Q1, Q2, and Q3). Q1 initiates with a set of identifying data that is searched and that relates to a potential client. The search results found are M1 and M2 and an initial validation score is determined by as 0.8 and 0.6 at each relationship, as indicated by the lines connecting Q1 with M1 and M2.

For example, an initial search cycle based on keywords or identifying data using the name: Jack Smith, data of birth: 26 Jan. 1916 and email: address@email.com. The results returned a new email address, a pseudo-name from a social network, an alias, a blog nickname, a service username, and/or any other character data related. Subsequently, in a further search (e.g., Q2, Q3, etc.) the results are employed to modify the existing data in Q1 or add to the data already stored from previous search results.

Subsequently, Q2 is a modified search that is performed with augmented or changed identifying data or search terms. In other words, new information resulting from M1 and M2 may supplement the identifying data or search terms used in Q1. Alternatively, Q2 is updated data resulting from a search with Q1, such as a new address or the like. Each data is relevant to different degrees to the creditworthiness of the potential client, and thus, is searched to determine and iteratively increase improve the validity and accuracy. Subsequently, Q2 is searched and returns M1, M2 and also M3 pieces of data related to the searched information data. According, to the different relationships analyzed by the relationship indicator 404, the validation score engine 402 provides a scored to each relationship, and/or to each a piece of metadata M1, M2 and M3. In addition, each new search, such as M3 further improves the calculation and either confirms the validity or negates the metadata discovered as not valid. In addition, scores may change not only as new data is discover (e.g., M3), but also as data from previous results has a difference in frequency in relation to the identifying data in used in the search or is further related to other metadata either used as search terms or stored in the profile of the client.

For example, before each new search cycle is started, the new attributes or related metadata affiliated to the potential client needs to be confirmed. This may be done by assigning a rating to each match. A higher rating or validation score from the validation engine 402 indicates a higher level of certainty that information belongs to the search subject and is valid. For example, an email address is a unique ID, therefore, if discovered that a user profile includes the same email address, there is a very high level of certainty attributed to the email address. Alternatively, matching a name or date of birth offers considerably low level of certainty. However, matching the name and the date of birth improves the quality of the match. Similarly, although a username usually is a unique ID within the same domain, it may belong to a different entity at a different domain. Although matching a name, date of birth and the username from two different domains provides very high probability that one and the other entities are the same.

Referring again to FIG. 4, the update component 406 can modify, alter, or otherwise update the set of keywords, the metadata stored in client profiles, the validation measures or scores, and/or the set of data sources 108 based at least in part on the set of search results returned by the query component 404. For example, where search results contain an alias employed by the client 104, and the update component 406 can include the alias in the set of keywords. As an additional example, the update component 406 can update the set of sources 108 based on information, such as an additional email address returned by the query component 404 for the user 104. For instance, if the query component 404 locates an internet email address associated with the user 104, wherein the internet email is hosted by a first social networking site (e.g., user@1stsocialnetwork.com), then the update component 406 can include the first social networking site in the set of sources 108.

Figure 6:
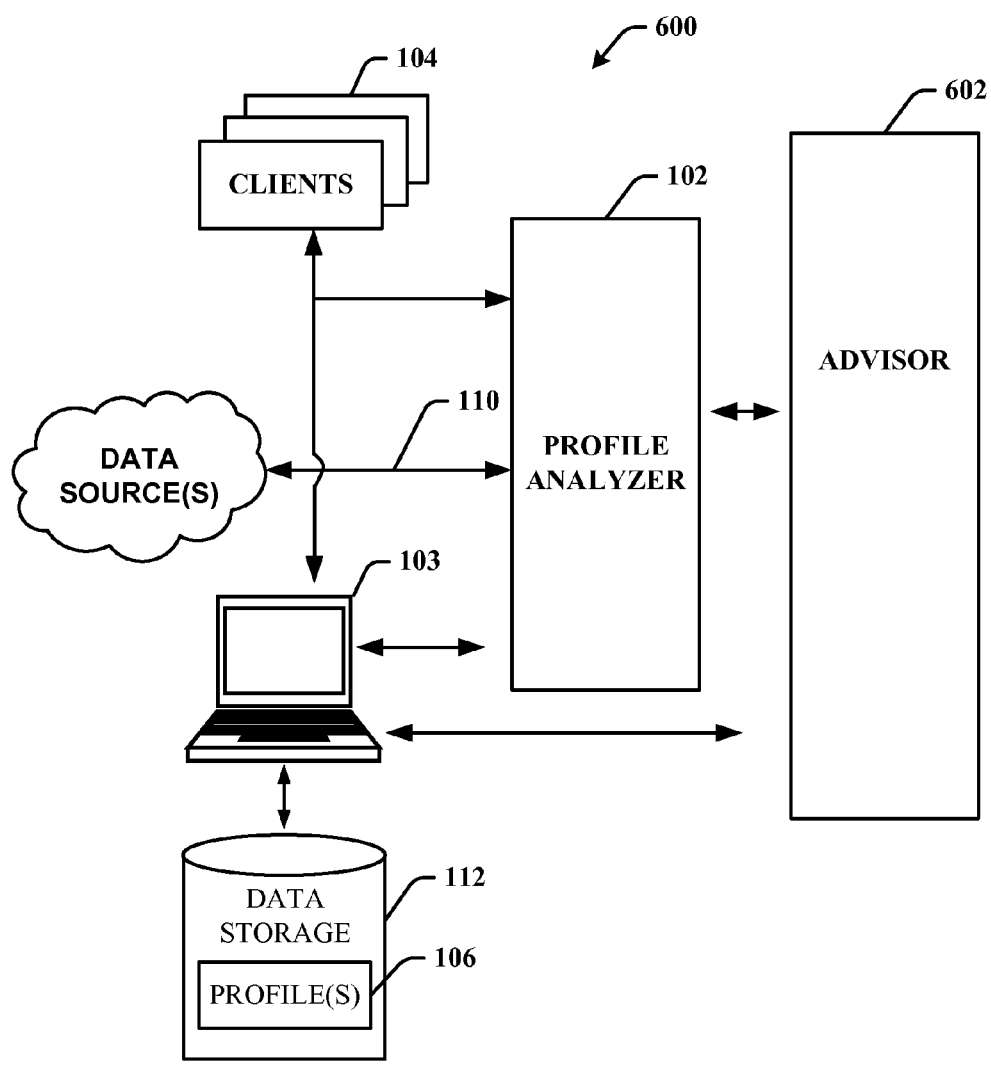
FIG. 6 illustrates another example recommendation system in accordance with various aspects described herein.

Turning now to FIG. 6, illustrated is an example advisor component 602 in accordance with various aspects described herein. The advisor component 602 is communicatively coupled to the profile analyzer 102 and provides feedback to the processing unit 103 where a user can receive output recommendations.

The advisor component 602 obtains data from the profiler analyzer 102. For example, the profile analyzer 102 generates a validation score that is based on the data relationships and/or frequency of occurrence of data in the different search results with respect to metadata compiled in a client profile from each iterative search conducted. The validation score is thus interpreted by the advisor component 602 as a probability that the identifying data modified/augmented with each new search is associated with the client. The validation score is used by the advisor component 602 to determine a reliability factor, in which the advisor used to factor a credit-worthiness score over time for a loan over or other financial product. The credit worthiness score may involve any number of factors and is not limited to only the reliability factor of the information gathered about the client, but in some embodiments may be factored only on the reliability factors and/or validity scores. In response to the client profile being dynamically updated, as discussed above, the advisor component, for example, alters a loan offer or the recommendations outputted from the system based on the validity scores. Consequently, the advisor component 602 is configured to generate a loan offer to a potential client based on the client profile being dynamically updated from public available sources or sources that are always available on a network, such as a wide area network or the like.

Figure 7:
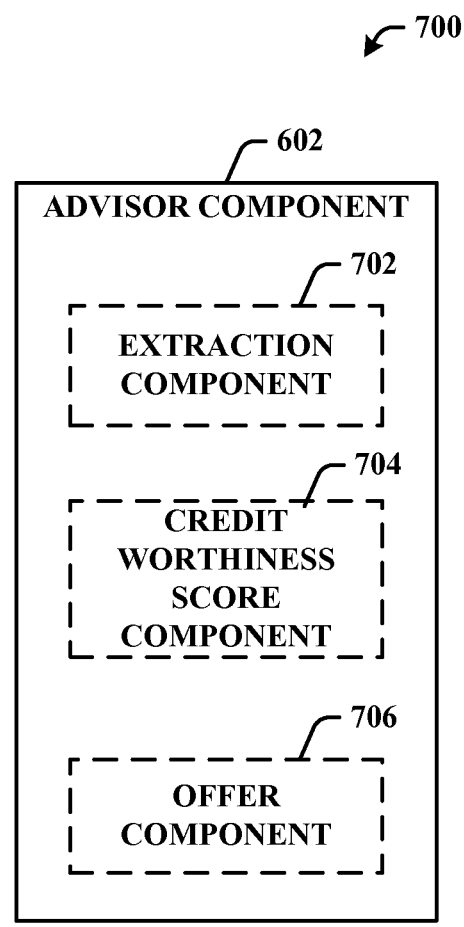
FIG. 7 illustrates an example advisor component in accordance with various aspects described herein.

Referring now to FIG. 7, illustrates an exemplary advisor component 602 of the system. The component 602 includes an extraction component 702, a credit-worthiness score component 704 and an offer component 706. Each component is communicatively coupled to one another to dynamically generate an output based upon a dynamically generated client profile regarding a potential client.

The extraction component 702 retrieves, obtains or otherwise extracts data from the profile analyzer. Data is also communicated to the advisor component 602 from the system 100, for example, and received at the extraction component 702. The extraction component 702 retrieves data needed to provide a recommended output to a user of the system. For example, a potential client may be provided a loan offer, a set of financial instruments approved for, and/or a range of investment offers. The extraction component 702 communicates the data as an interface to the credit worthiness score component 704. A client's credit score is calculated at the credit-worthiness component based on the data dynamically updated in the client's profile and communicated by the extraction component 702. The score may be any scored weighted with different factors in an equation or algorithm as one of ordinary skill in the art will appreciate. For example, the validity and relevance of the data accumulated about the client is used as a factor or as the basis for a credit-worthiness score calculation. The offer component 706 then provides various terms, instruments, ranges, financial numbers and the like for presenting to the client.

Additionally, the offer component 706 intelligently determines or infers categorization of the profile 106, approval for one or more offers, or a set of terms for the offers. Any of the foregoing inferences can potentially be based upon, e.g., Bayesian probabilities or confidence measures or based upon machine learning techniques related to historical analysis, feedback, and/or other determinations or inferences.

Figure 8:
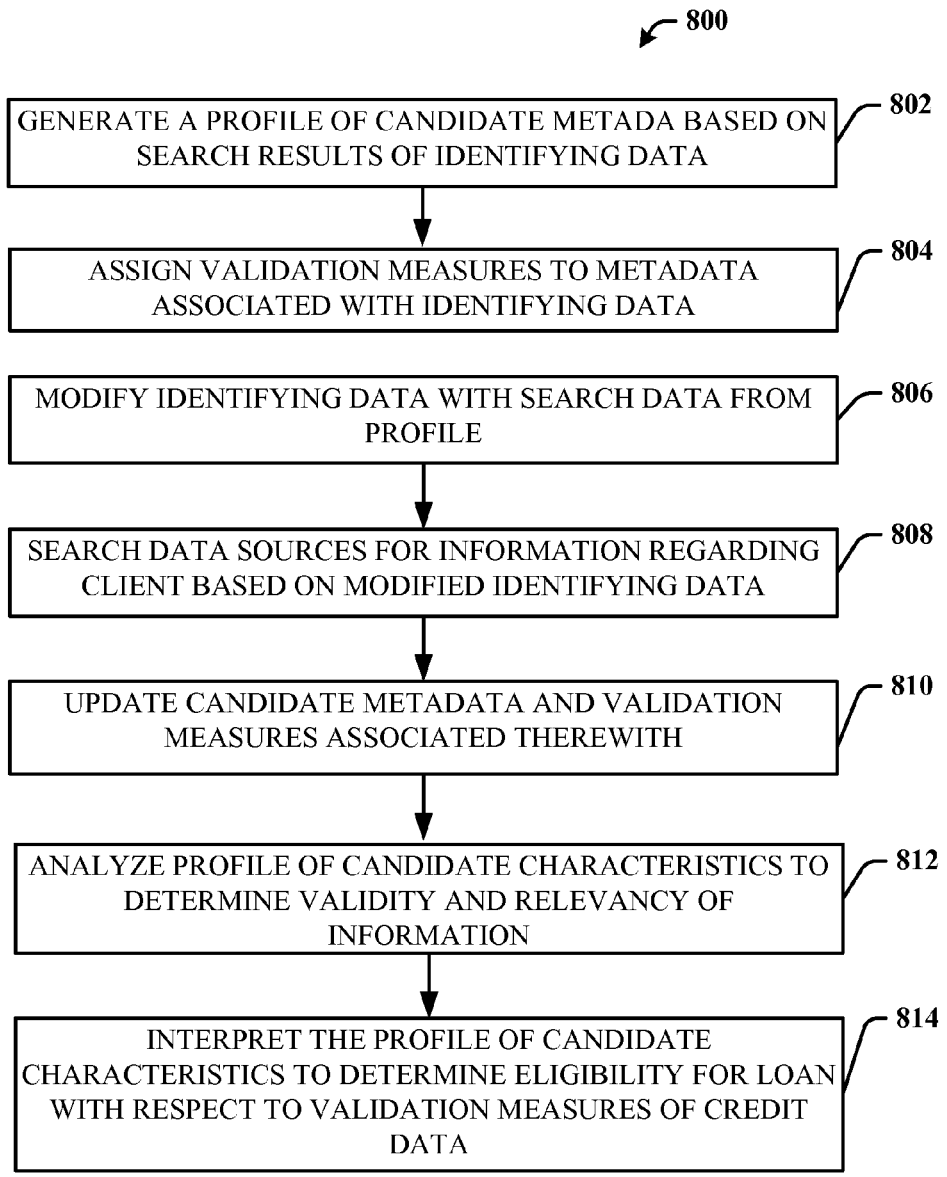
FIG. 8 a flow diagram showing an exemplary non-limiting implementation for compiling information dynamically and determining eligibility of a loan based on a client profile.

An example methodology 800 for implementing a method for a recommendation system is illustrated in FIG. 8. Reference is made to the figures described above for ease of description. However, the method 800 is not limited to any particular embodiment or example provided within this disclosure.

The method 800, for example, provides for a system to iteratively and dynamically search data regarding a potential client based on automatic augmentation or modification of the search terms (e.g., identifying data) related to the client while also dynamically and iteratively validating the data stored in a profile from each search. At 802 at profile is generated with candidate or client metadata, which is based upon search results of data that identifies the candidate. For example, the set of identifying data can include a first name, a last name, a date of birth, age, an email address, user name, domain name, geographical residence, telephone number, history and the like. As discussed previously, the identifying data can be received from the user, extracted from a form extraction system, a disparate user (e.g., customer service representative, agent, etc.), obtained from a data store, or an associated profile and from any trusted source of data.

At 804 validation measures are assigned to the metadata stored in the profile of the candidate. Relationships among the metadata and frequency of occurrences are analyzed and used to provide a validity measure in which a creditworthiness score can be determined. The validity measures provide for a means to determine the relevancy and accuracy For example, where the information obtained about the client has a high validity and relevance to the client's credit score, a confidence or reliability score can be determined that results in a corresponding suitable loan offer to be recommended for the potential client.

At 806, the data is modified such as by being altered, changed, augmented or subtracted from the initial identifying data in order to provide more accurate search results in an additional search. At 808, data sources are searched for additional or confirming information regarding the client based on the modified identifying data.

At 810, the client/candidate metadata is updated and the validation measures corresponding thereto are also updated. At 812, the profile with the associated metadata having validity scores associated therewith is analyzed to determine validity and relevancy. The validity and relevance of the pieces of metadata is determined by comparing the information to other known information, or additional search results, and generating a confidence score for the information based at least in part on the comparison. If the confidence score is within a predetermined confidence threshold, then the information is determined accurate. Additionally or alternatively, the confidence score can be generated based at least in part on whether the data satisfies a set of verification criterion. The relevancy of the information to the offer eligibility determination is determined based at least in part on a set of offer criterion. For example, the set of offer criterion for a loan can include a set of predetermined characteristics, such as age, gender, profession, income, residence, education, debt, and so forth, and if the data information included in the profile correlates to the criterion, then it is relevant.

Exemplary Networked and Distributed Environments

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 9:
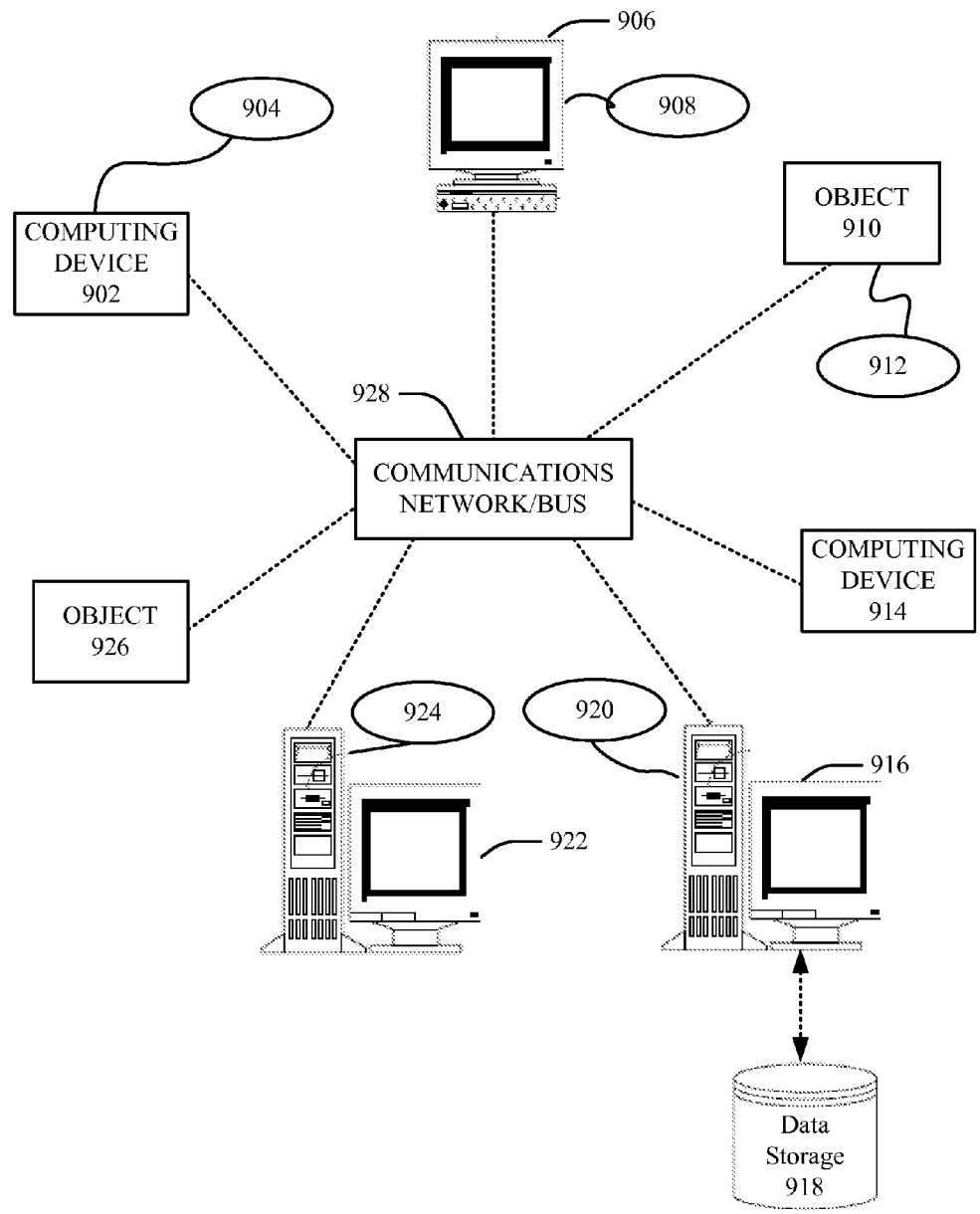
FIG. 9 is a block diagram representing exemplary non-limiting networked environments in which various non-limiting embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting embodiments, i.e., anywhere that a device may wish to engage on behalf of a user or set of users. Accordingly, the below general purpose remote computer described below in FIG. 10 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
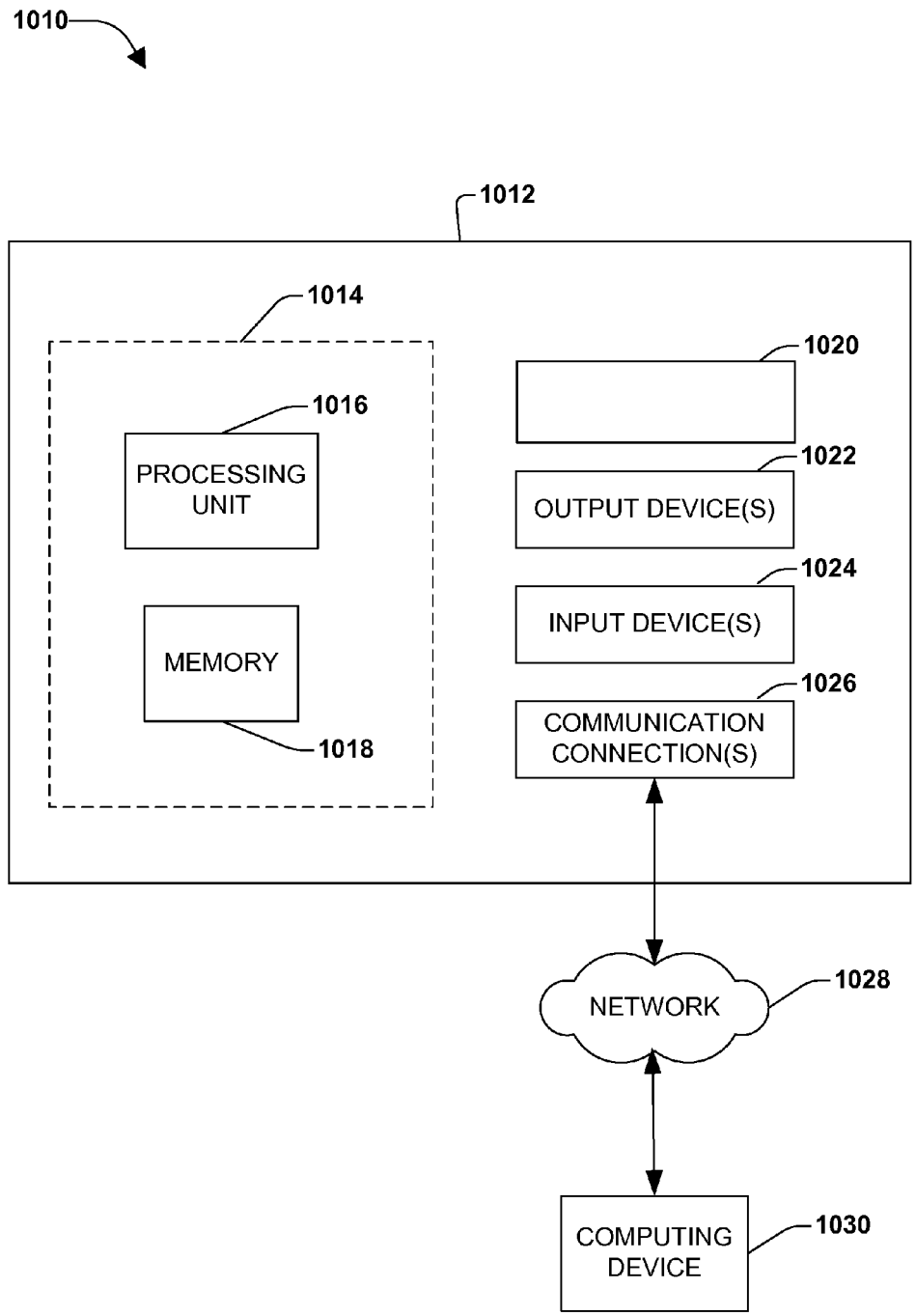
FIG. 10 is a block diagram representing an exemplary non-limiting computing system or operating environment in which one or more aspects of various non-limiting embodiments described herein can be implemented.

FIG. 10 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1018 and storage 1020 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer readable storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A system for augmentation of search terms and validation of data relevance, comprising:
a memory that stores computer-executable components; and
a processor device, communicatively coupled to the memory, that facilitates execution of the computer-executable components, the computer-executable components comprising:
a search engine configured to generate a first set of search results related to a client profile from a set of data sources based on identifying data;
a profile analyzer configured to generate the client profile with one or more metadata extracted from the first set of search results and to generate a rank of the one or more metadata according to a validation measure; and
an augmentation module configured to:
select at least a portion of the one or more metadata based on the rank of the one or more metadata as a set of search data from the client profile,
modify the identifying data with the set of search data as modified identifying data, and
initiate a search for a second set of search results that includes the one or more metadata from the set of data sources based on the modified identifying data; and
a validation engine configured to:
validate the identifying data based on association strengths between the identifying data, the first and second sets of search results,
validate the one or more metadata by generating validation scores for the one or more metadata based on the association strengths and a frequency of occurrence of the one or more metadata in the first and second sets of search results; and
dynamically re-rank the one or more metadata based on the association strengths and the frequency of occurrence; and
the profile analyzer is further configured to update the one or more metadata of the client profile to generate an updated client profile using the dynamic re-rank of the one or more metadata.

2. The system of claim 1, wherein the validation engine is further configured to change at least one of the validation scores in response to:
a change of an association strength of the identifying data;
a change of at least one of the one or more metadata, or
a change of a number of the association strength among the identifying data, the first and second sets of search results, and the one or more metadata.

3. The system of claim 2, further comprising an advisor component, coupled to the profile analyzer, configured to factor a credit worthiness score for a financial loan offer based on the validation scores.

4. The system of claim 3, wherein the advisor component is further configured to alter the financial loan offer based upon the updated client profile to increase accuracy of the validation scores.

5. The system of claim 1, further comprising an advisor component configured to generate a financial loan offer based on the updated client profile from publicly available data sources on a wide area network.

6. The system of claim 1, wherein the augmentation module is further configured to select the set of search data from the client profile based on the validation scores associated with the one or more metadata.

7. The system of claim 6, wherein the augmentation module is further configured to select the set of search data, from among the one or more metadata, having one or more of the validation scores that meet a predetermined condition.

8. The system of claim 7, wherein the identifying data and the set of search data include personal data as input to an advisor component that is configured to determine a credit worthiness score and to generate a financial loan offer based on the updated client profile.

9. The system of claim 7, wherein the search engine is further configured to update at least the identifying data or the set of data sources, based at least in part on a validation score from the validation measure of the one or more metadata in the updated client profile.

10. A method for augmentation of search terms and validation of data relevance, comprising:
executing a first search of a set of data sources with a set of first identifying data by the search engine resulting in a set of search results;
selecting one or more metadata from the set of search results to include in a client profile;
associating a validation measure with the one or more metadata;
modifying the set of first identifying data with a set of search data that is selected from the one or more metadata based on the validation measure in the client profile to form a set of second identifying data;
executing a second search of the set of data sources using the set of second identifying data to obtain additional search results that include the one or more metadata;
validating the one or more metadata by generating validation scores for the one or more metadata based on the association strengths and a frequency of occurrence of the one or more metadata in the set of search results and the additional search results;
dynamically re-ranking the one or more metadata based on the association strengths and the frequency of occurrence; and
updating the one or more metadata of the client profile to generate an updated client profile using the dynamic re-rank of the one or more metadata.

11. The method of claim 10, further comprising:
determining the association strengths having the set of first identifying data that is associated with the one or more metadata of the client profile and assigning different validation scores to at least a subset of the association strengths among the set of first identifying data and the one or more metadata.

12. The method of claim 10, further comprising:
changing at least one of the validation scores in response to a change of a number of association strengths with the set of first identifying data, the set of second identifying data and the one or more updated metadata.

13. The method of claim 10, further comprising:
generating a financial loan offer based on the one or more updated metadata of the client profile from publicly available data sources of a public network.

14. The method of claim 10, further comprising:
generating a financial loan offer based on the validation measure of the one or more updated metadata of the client profile from publicly available data sources.

15. The method of claim 10, further comprising:
selecting the set of search data from the one or more metadata of the client profile based on the validation measure associated with the one or more metadata and wherein the modifying includes augmenting the set of first identifying data with the set of search data at input component of the search engine to be searched for the additional search results.

16. The method of claim 10, further comprising:
determining an eligibility for a financial loan or a financial loan offer amount for at least one financial loan offer based at least in part on the validation measure associated with the one or more metadata of the client profile.

17. The method of claim 10, further comprising:
determining the set of data sources based at least in part on at least one of the set of first identifying data, or the one or more metadata, wherein the set of first identifying data includes data related to a current credit score.

18. The method of claim 10, wherein the selecting the one or more metadata further comprises:
determining a subset of the one or more metadata matching a set of predetermined characteristics for determining eligibility for a financial loan offer.

19. The method of claim 10, wherein the executing the first search and the second search of the set of data sources further comprises executing the first search and the second search against at least one of a website, a search engine, a social networking site, an online resume database, a job board, a government record, an online group, a payment processing service, or an online subscription in order to determine a credit worthiness score based on the validation measure associated with the one or more metadata.

20. A non-transitory computer readable storage medium comprising computer executable instructions that, in response to execution, cause a computing system to perform operations for augmentation of search terms and validation of data relevance, comprising:
executing with a search engine a first search of a set of data sources using a set of first identifying data by the search engine resulting in a set of search results;
generating a client profile with one or more metadata from the set of search results and associating at least a rank to the one or more metadata based on a validation measure;
augmenting the set of first identifying data with a set of search data that is selected from the one or more metadata based on the validation measure in the client profile to form a set of second identifying data;
executing a second search of the set of data sources using the set of second identifying data to obtain additional search results that include the one or more metadata;
validating the one or more metadata by generating validation scores for the one or more metadata based on the association strengths and a frequency of occurrence of the one or more metadata in the set of search results and the additional search results;
dynamically re-ranking the one or more metadata based on the association strengths and the frequency of occurrence; and
updating the one or more metadata of the client profile to generate an updated client profile using the dynamic re-rank of the one or more metadata.

21. The computer readable storage medium of claim 20, wherein the operations further comprising:
dynamically determining a credit worthiness score based upon the validity scores associated with the one or more metadata in the client profile.

22. A system for augmentation of search terms and validation of data relevance, comprising:
means for searching with a set of identifying data and to generate a first set of search results from a set of data sources;
means for generating a client profile with one or more metadata retrieved from the first set of search results and with at least a rank associated to the one or more metadata according to a validation measure;
means for modifying the set of identifying data with at least one metadata selected from the one or more metadata based on the validation measure to form a modified set of identifying data to initiate further searching the set of data resources using the modified set of identifying data for a second set of search results that includes the one or more metadata;
means for validating the one or more metadata by generating validation scores for the one or more metadata based on the association strengths and a frequency of occurrence of the one or more metadata in the first and second sets of search results;
means for dynamically re-ranking the one or more metadata based on the association strengths and the frequency of occurrence; and
means for updating the one or more metadata of the client profile to generate an updated client profile using the dynamic re-rank of the one or more metadata.

* * * * *